United States Patent
Kondo (10) Patent No.: US 8,076,260 B2
(45) Date of Patent: Dec. 13, 2011

(54) SUBSTRATE STRUCTURE AND MANUFACTURING METHOD OF THE SAME

(75) Inventor: Daiyu Kondo, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 508 days.

(21) Appl. No.: 12/098,724

(22) Filed: Apr. 7, 2008

(65) Prior Publication Data
US 2008/0248945 A1    Oct. 9, 2008

(30) Foreign Application Priority Data

Apr. 6, 2007  (JP) ................................. 2007-100987

(51) Int. Cl.
*B01J 21/18*   (2006.01)
*B01J 23/40*   (2006.01)
*B01J 23/74*   (2006.01)
*H01L 23/48*   (2006.01)
*H01L 23/52*   (2006.01)
*H01L 29/40*   (2006.01)

(52) U.S. Cl. .................. 502/185; 257/774; 257/E51.04; 977/701; 977/707; 977/742; 977/762; 977/773; 977/775; 977/842

(58) Field of Classification Search .................. 502/185; 977/701, 707, 742, 762, 773, 775, 842; 257/774, 257/E51.04
See application file for complete search history.

(56) References Cited

U.S. PATENT DOCUMENTS

| | | | |
|---|---|---|---|
| 6,232,706 B1 * | 5/2001 | Dai et al. | 313/309 |
| 6,514,113 B1 * | 2/2003 | Lee et al. | 445/50 |
| 6,764,874 B1 * | 7/2004 | Zhang et al. | 438/99 |
| 6,855,376 B2 * | 2/2005 | Hwang et al. | 427/404 |
| 6,967,013 B2 * | 11/2005 | Someya et al. | 423/447.3 |
| 7,335,395 B2 * | 2/2008 | Ward et al. | 427/198 |
| 7,354,881 B2 * | 4/2008 | Resasco et al. | 502/185 |
| 7,417,320 B2 * | 8/2008 | Kawabata et al. | 257/774 |
| 7,767,615 B2 * | 8/2010 | Kinloch et al. | 502/185 |
| 7,767,616 B2 * | 8/2010 | Liu et al. | 502/185 |
| 2006/0290003 A1 * | 12/2006 | Kawabata et al. | 257/774 |

FOREIGN PATENT DOCUMENTS

| | | |
|---|---|---|
| JP | 2003-277033 A | 10/2003 |
| JP | 2005-145743 A | 6/2005 |

OTHER PUBLICATIONS

"Growth of Single-Walled Carbon Nanotubes from Discrete Catalytic Nanoparticles of Various Sizes", Yiming Li et al. J. Phys. Chem. B 2001, 105, pp. 11424-11431.*
Shintaro Sato et al; "Growth of diameter-controlled carbon nanotubes using monodisperse nickel nanoparticles obtained with a differential mobility analyzer," Chemical Physics Letters 382 (2003); pp. 361-366.
Shintaro Sato et al; "Novel approach to fabricating carbon nanotube via interconnects using size-controlled catalyst nanoparticles," IEEE 2006; pp. 230-232.

* cited by examiner

Primary Examiner — Patricia L Hailey
(74) Attorney, Agent, or Firm — Westerman, Hattori, Daniels & Adrian, LLP (57) ABSTRACT

After a titanium nitride (TiN) thin film is formed on a silicon substrate, cobalt (Co) fine particles and nickel (Ni) fine particles are deposited in a mixed state on the titanium nitride (TiN) thin film, and CNTs are sequentially grown from the cobalt (Co) fine particles and the nickel fine particles by varying growth conditions.

14 Claims, 5 Drawing Sheets

SUBSTRATE STRUCTURE AND MANUFACTURING METHOD OF THE SAME

CROSS-REFERENCE TO RELATED APPLICATIONS

This application is based upon and claims the benefit of priority from the prior Japanese Patent Application No. 2007-100987, filed on Apr. 6, 2007, the entire contents of which are incorporated herein by reference.

BACKGROUND OF THE INVENTION

1. Field of the Invention

The present invention relates to a substrate structure using a so-called carbon nano tube (CNT), a carbon nano fiber (CNF) or the like, which is a linear structure made of a carbon element and a manufacturing method of the same.

2. Description of the Related Art

A CNT and a CNF being linear structures of carbon-based self-organizing materials, in which, especially the CNT attracts attention because of its many appealing physical properties.

The CNT possesses a low electrical resistance and a high mechanical strength, and because of such excellent properties, it is expected to be applied to a wide range of fields such as a semiconductor device, various sensors such as an acceleration sensor, an electronic device and a heat radiating device, represented by an LSI.

In order to apply the CNT to a via portion of a wiring structure of the LSI, for example, there is a need to obtain the electrical resistance that is substantially the same or more of a copper wiring used at present, and to achieve this, the CNT must have its density of $10^{12}$ number/cm$^2$ or more. In order to control the CNT density to be a desired high density, there is a need to form a catalytic material in fine particle state, which is to be nuclei for growing the CNTs, and to control a density and a size thereof. For example, Patent Document 1 discloses a technique in which after a catalytic metal layer is formed on an aluminum layer being a base thin film, fine particles including the catalytic metal are formed by heat treatment. Further, Non-Patent Document 1 discloses a technique in which catalytic fine particles previously generated by a laser ablation method are classified into desired sizes in a gaseous phase, and thereafter, they are deposited on a substrate in high density.

[Patent Document 1] Japanese Patent Application Laid-Open No. 2005-145743

[Patent Document 2] Japanese Patent Application Laid-Open No. 2003-277033

[Non-Patent Document 1] S. Sato et. al., CPL 382 (2003) 361

[Non-Patent Document 2] S. Sato et. al., in Proc. IEEE International Interconnect Technology Conference 2006, p. 230.

In order to generate the CNTs in high density, a densification of the catalytic fine particles is a must, and for that reason, it is required to control the sizes of the catalytic fine particles. In a method disclosed in Patent Document 1, it is difficult to control a shape of the catalytic fine particle, such as a diameter, and since the catalytic thin film is applied, the densification of the catalytic fine particles is difficult. Further, according to Non-Patent Document 1, it is possible to deposit the catalytic fine particles in high density by controlling the sizes thereof, but, an aggregation of each of the catalytic fine particles under a growth temperature is unavoidable, and even if the catalytic fine particles do not aggregate, when they contact with each other, an activity functioning as a catalyst of the CNT is lowered due to the contact, which prevents the densification of the CNTs.

SUMMARY OF THE INVENTION

According to an aspect of an embodiment, there is a substrate structure has: a substrate; a base material formed in a predetermined region above the substrate; a catalytic material formed in the predetermined region; and a linear structure made of a carbon element and formed on the catalytic material, in which the catalytic material is formed by mixing a plurality of kinds of catalytic fine particles each having a different catalytic ability.

According to an aspect of an embodiment, there is a manufacturing method of a substrate structure has the steps of: forming a base material in a predetermined region above a substrate; forming a catalytic material in the predetermined region; and growing a linear structure made of a carbon element using the catalytic material as a nucleus, in which the catalytic material is formed by mixing a plurality of kinds of catalytic fine particles each having a different catalytic ability.

DETAILED DESCRIPTION OF THE PREFERRED EMBODIMENTS

Basic Gist of Present Invention

Catalytic abilities of catalytic fine particles to be nuclei for growing CNTs determine growth states of the CNTs (to start growing CNTs or not, growth speed, diameter of CNT, and the like), so that by using the catalytic fine particles differed in the catalytic abilities, the growth state of the CNTs can be controlled.

In order to prevent an aggregation of the catalytic fine particles to thereby realize a growth of the CNTs in high density, the present invention uses two kinds or more of the catalytic fine particles each possessing a different catalytic ability as a catalytic material, and the catalytic material is deposited so that the respective catalytic fine particles are mixed on a base material. By taking this structure, the plurality of kinds of catalytic fine particles in the deposited catalytic material are randomly averaged to be deposited, resulting that the number of portions where a lot of catalytic fine particles having the same catalytic ability are adjacent to each other is remarkably decreased. Accordingly, an occurrence probability of aggregation is dramatically lowered, so that an activity as a catalytic material is maintained without being lowered.

Concretely, the respective catalytic fine particles are formed of each different material. If only one kind of catalytic fine particle is used, when raising a temperature to a growth temperature of the CNT, the catalytic fine particles aggregate to each other, and the activity is lowered. On the other hand, when the catalytic fine particles made of a plurality of kinds of different elements are mixed, such an aggregation is unlikely to happen. Therefore, it becomes possible to grow the CNTs with diameters corresponding to sizes of the generated catalytic fine particles in high density. Further, since the catalytic fine particles made of different kinds of elements differ in catalytic abilities from each other, even when they are adjacent and in contact, they have little effect on mutual activities.

Further, the respective catalytic fine particles may be formed of the same material with different sizes. Also in this case, since each of the catalytic fine particles possesses the different catalytic ability, the aggregation can be prevented, and even when they are adjacent and in contact, they have little effect on mutual activities. Furthermore, as the growth state, the CNTs with different diameters can be grown, so that a CNT bundle with higher density can be formed.

Here, as a material of the respective catalytic fine particles, the one including at least one kind of metal selected from the metal group consisting of iron (Fe), nickel (Ni), cobalt (Co), gold (Au), silver (Ag), and copper (Cu), or at least one kind of alloy selected from the alloy group consisting of alloys composed of two kinds or more of iron (Fe), nickel (Ni), cobalt (Co), gold (Au), silver (Ag), and copper (Cu) is preferable to be used. Further, an alloy of the above-described base material and the catalytic material such as titanium/cobalt (TiCo) and molybdenum/cobalt (MoCo) can also be applied.

Further, for the base material, the one including at least one kind selected from the group consisting of titanium (Ti), tantalum (Ta), titanium nitride (TiN), tantalum nitride (TaN), aluminum (Al), hafnium nitride (HfN), molybdenum (Mo), and titanium silicide (TiSi) is preferable.

Note that, in Patent Document 2, a method to grow the CNTs using a multilayer film structure composed of two kinds or more of catalytic metals is disclosed, but, in Patent Document 2, the catalytic metals are formed in a thin film in the first place, so that it can be said that the method takes a completely different structure as that of the present invention.

SPECIFIC EMBODIMENTS APPLYING THE PRESENT INVENTION

Hereinafter, specific embodiments applying the present invention will be explained in detail with reference to the drawings. In the present embodiment, a structure of a substrate structure will be specifically explained together with a manufacturing method thereof, for the sake of explanation. Note that the same reference numerals and symbols are used to designate the composing members and the like common to the respective embodiments.

First Embodiment

Figure 1A:
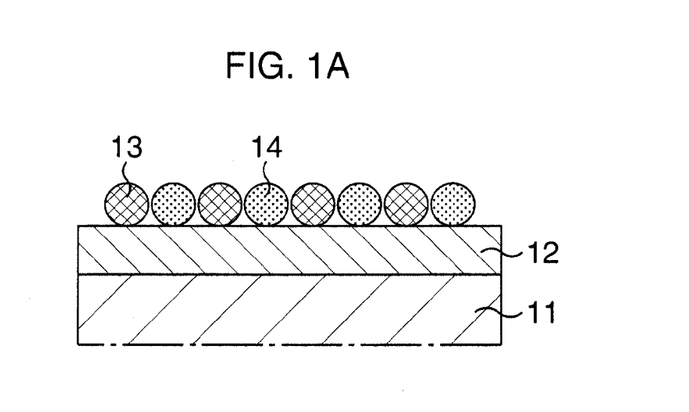
FIGS. 1A to 1C are schematic sectional views showing a manufacturing method of a substrate structure according to a first embodiment in order of step.
Figure 1B:
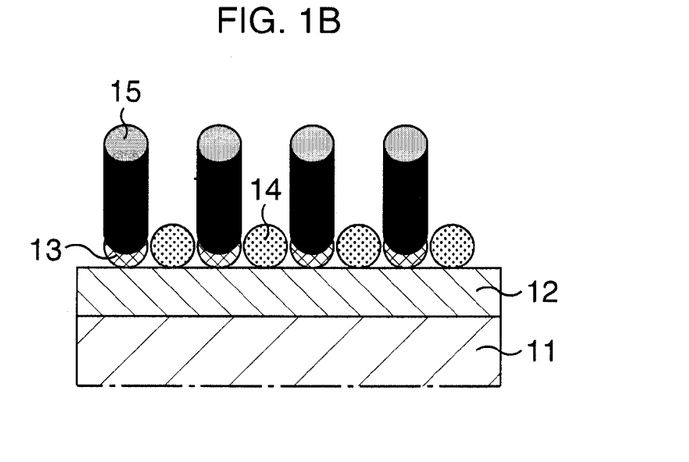
Figure 1C:
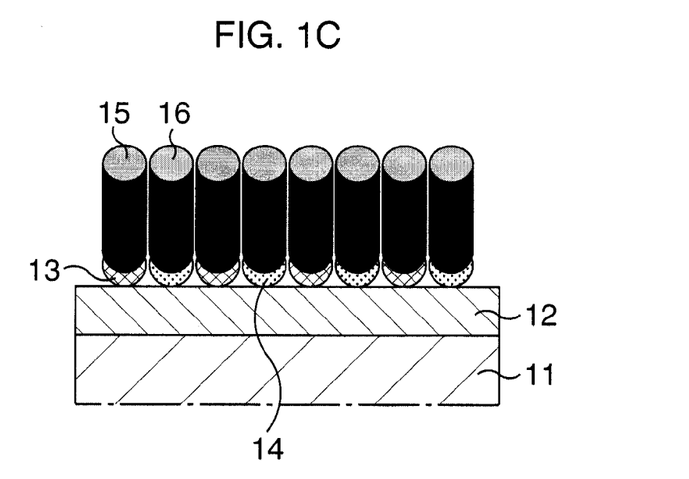

FIGS. 1A to 1C are schematic sectional views showing a manufacturing method of a substrate structure according to a first embodiment in order of step.

As shown in FIG. 1A, after forming a titanium nitride (TiN) thin film 12 on a silicon substrate 11, cobalt (Co) fine particles 13 and iron (Fe) fine particles 14 are deposited in a mixed state on the titanium nitride (TiN) thin film 12.

Specifically, at first, with the use of titanium nitride (TiN) as a base material, the titanium nitride (TiN) thin film 12 is formed to have about 5 nm in film thickness on the silicon substrate 11 using, for instance, a sputtering method.

Next, with the use of cobalt (Co) fine particles and iron (Fe) fine particles as a catalytic material, the cobalt (Co) fine particles and the iron (Fe) fine particles are generated using, for example, a laser ablation method, and the cobalt (Co) fine particles 13 and the iron (Fe) fine particles 14 having an average particle diameter (diameter) aligned by applying, for instance, a method using a differential mobility analyzer (DMA) described in Patent Document 1, a method using an impactor described in Patent Document 2, or the like, are deposited in the mixed state in one layer on the titanium nitride (TiN) thin film 12. The deposition is conducted separately according to the kinds of the different fine particles. The deposition can be performed by using different targets or by exchanging the targets in the same device. In the present embodiment, the cobalt (Co) fine particles 13 and the iron (Fe) fine particles 14 each having an average diameter controlled to fall within a range of 1 to 30 nm, here, about 4 nm, and each having a standard deviation of a diameter distribution controlled to be within 1.5, here, about 1.3, are sequentially deposited on the titanium nitride (TiN) thin film 12.

The laser ablation method is a method in which a desired metal target is hit by a pulse laser (for example, a second-harmonic Nd:YAG laser at a repetition frequency of 20 Hz) to generate vapor. This vapor is cooled by a carrier gas (helium (He), for instance) at a flow rate of, for example, 1 slpm (standard liter per minute) to generate fine particles. Thereafter, the generated fine particles are classified by the DMA or the impactor and led to a deposition chamber, and then deposited on a desired substrate (titanium nitride (TiN) thin film 12, in the present embodiment).

Subsequently, CNTs 15 and 16 are grown.

In order to grow the CNTs, the silicon substrate 11 is placed in a not-illustrated CVD chamber, a temperature is raised to 450° C., and a mixed gas of acetylene as a source gas and argon as a buffer gas is introduced into the CVD chamber.

The CVD used in the present embodiment is a thermal CVD, but, in addition to that, a thermal filament CVD, a remote plasma CVD, a plasma CVD, and the like can also be used. Further, as for the growth gas, not only acetylene, but also hydrocarbon such as methane and ethylene, alcohol such as ethanol and methanol, and gas containing carbon such as carbon monoxide and carbon dioxide are cited as candidates for the source gas, so that it is not limited to acetylene.

The cobalt (Co) fine particles and the iron (Fe) fine particles differ in optimal growth conditions due to a difference in their catalytic abilities. In the present embodiment, the CNTs 15 are grown at first, using the cobalt (Co) fine particles 13 as nuclei, as shown in FIG. 1B.

Specifically, by introducing the above-described mixed gas in which a partial pressure of acetylene with respect to that of argon is 0.0025% into the CVD chamber, and setting a pressure in the whole chamber at 1 kPa, the CNTs 15 are grown using the cobalt (Co) fine particles 13 as the nuclei. Under this growth condition, the CNTs are grown only from the cobalt (Co) fine particles, and rarely from the iron (Fe) fine particles.

Next, a temperature is raised to 600° C., to thereby grow the CNTs 16 using the iron (Fe) fine particles 14 as nuclei, as shown in FIG. 1C.

Specifically, the above-described mixed gas in which a partial pressure of argon with respect to that of acetylene is 10% is introduced into the CVD chamber, in which hydrogen is further added so that a partial pressure of the mixed gas of acetylene and argon becomes 10%. The pressure in the whole chamber is set at 0.1 kPa, and the CNTs 16 are grown using the iron (Fe) fine particles 14 as the nuclei.

Note that, when using the cobalt (Co) fine particles and the iron (Fe) fine particles as a catalytic material, it is desirable that the base material be at least one kind selected from the group consisting of titanium (Ti), tantalum (Ta), tantalum nitride (TaN), titanium silicide (TiSi), hafnium nitride (HfN), molybdenum (Mo), and aluminum (Al), in addition to the titanium nitride (TiN) thin film. Further, when a tantalum (Ta) thin film is formed as a base material or formed under the base material (for instance, titanium nitride (TiN)), it is possible to form a metal wiring such as aluminum (Al) copper (Cu), platinum (Pt), and gold (Au) just under the tantalum (Ta) thin film, since the tantalum (Ta) thin film is excellent especially in preventing a diffusion of the metal. Further, it is also possible to use a material made of tantalum nitride (TaN), titanium (Ti), or titanium silicide (TiSi) having substantially the same function as that of tantalum (Ta). As a film structure composed of the metal wiring, there can be cited such as, catalytic fine particle/titanium nitride (TiN)/tantalum (Ta)/copper (Cu) wiring, catalytic fine particle/aluminum (Al)/tantalum (Ta)/copper (Cu) wiring, catalytic fine particle/tantalum (Ta)/copper (Cu) wiring, catalytic fine particle/molybdenum (Mo)/tantalum (Ta)/copper (Cu) wiring, and catalytic fine particle/titanium (Ti)/copper (Cu) wiring.

Further, the two kinds of catalytic fine particles being the catalytic material are not limited to cobalt (Co) and iron (Fe), but may be formed of two kinds of mutually different metals selected from the metal group consisting of iron (Fe), nickel (Ni), cobalt (Co), gold (Au), silver (Ag), and copper (Cu), or two kinds of mutually different alloys selected from the alloy group consisting of alloys composed of two kinds or more of iron (Fe), nickel (Ni), cobalt (Co), gold (Au), silver (Ag), and copper (Cu). Further, an alloy of the above-described base material and the catalytic material such as titanium/cobalt (TiCo) and molybdenum/cobalt (MoCo) can also be applied.

If only one kind of the catalytic fine particle is used, when raising the temperature to the growth temperature of the CNT, the catalytic fine particles aggregate to each other, and the activity is lowered. On the other hand, when the catalytic fine particles made of the plurality of kinds of different elements, two kinds of the cobalt (Co) fine particles 13 and the iron (Fe) fine particles 14 in the present embodiment, are mixed, such an aggregation is unlikely to happen. Therefore, it becomes possible to grow the CNTs 15 and 16 with diameters corresponding to the sizes of the generated cobalt (Co) fine particles 13 and the iron (Fe) fine particles 14 in high density. Further, since the cobalt (Co) fine particles 13 and the iron (Fe) fine particles 14 differ in catalytic abilities from each other, even when they are adjacent and in contact, they have little effect on mutual activities.

As described above, according to the present embodiment, it is possible to grow the CNTs 15 and 16 made of carbon elements with controlled diameters in high density by forming the catalytic material, here, the cobalt (Co) fine particles 13 and the iron (Fe) fine particles 14, easily and certainly in a mixed state of uniform and high-density fine particles by a simple structure.

Here, there also exists a growth condition under which the CNTs are collectively grown from the two kinds of fine particles. In such a case, nickel (Ni) fine particles are used instead of the iron (Fe) fine particles.

Specifically, it is required such that the above-described mixed gas in which a partial pressure of argon with respect to that of acetylene is 0.0025% is introduced into the CVD chamber, and the pressure in the whole chamber and the growth temperature are respectively set at 1 kPa and 450° C. Accordingly, the CNTs 15 and 16 can be grown using the cobalt (Co) fine particles and the nickel (Ni) fine particles, respectively, as nuclei, by a single CVD process. Further, in this case, it becomes possible to keep the growth temperature low.

Second Embodiment

Figure 2A:
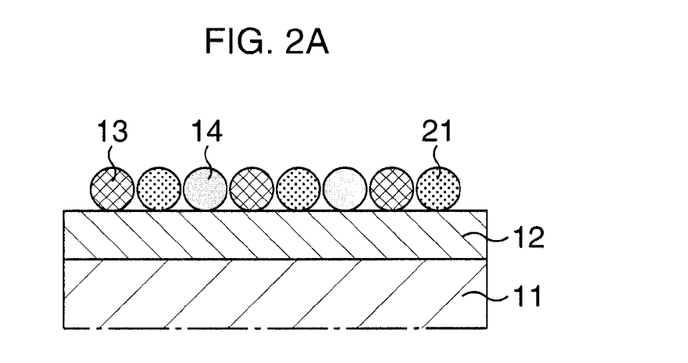
FIGS. 2A to 2C are schematic sectional views showing a manufacturing method of a substrate structure according to a second embodiment in order of step.
Figure 2B:
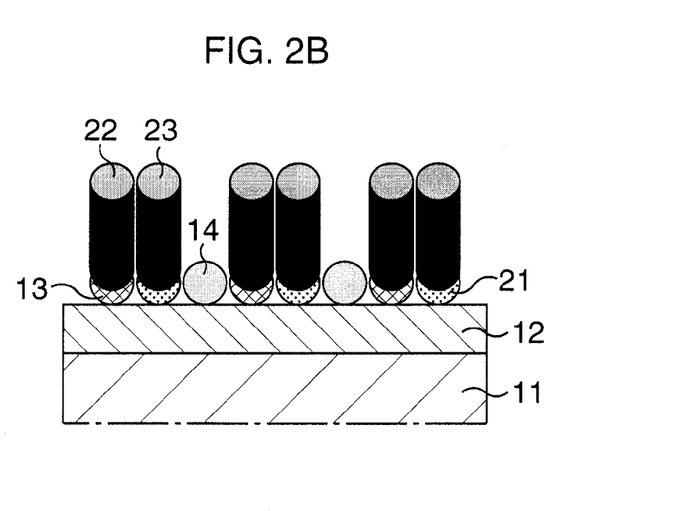
Figure 2C:
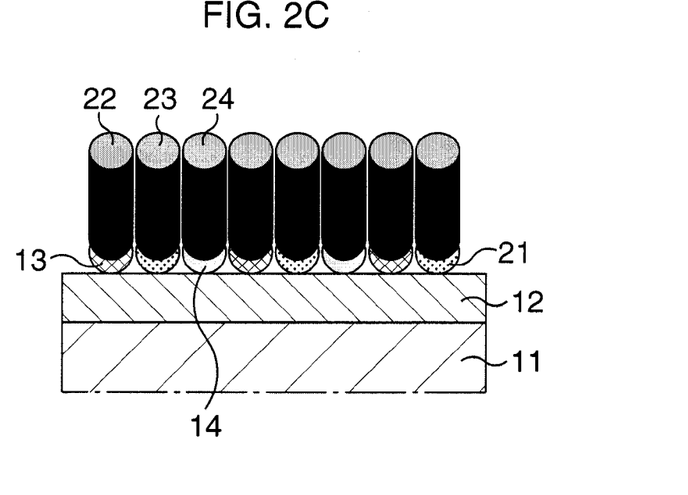

FIGS. 2A to 2C are schematic sectional views showing a manufacturing method of a substrate structure according to a second embodiment in order of step. As shown in FIG. 2A, after forming the titanium nitride (TiN) thin film 12 on the silicon substrate 11, the cobalt (Co) fine particles 13, the iron (Fe) fine particles 14, and nickel (Ni) fine particles 21 are deposited in a mixed state on the titanium nitride (TiN) thin film 12.

Specifically, at first, with the use of titanium nitride (TiN) as a base material, the titanium nitride (TiN) thin film 12 is formed to have about 5 nm in film thickness on the silicon substrate 11 using, for instance, a sputtering method.

Next, with the use of cobalt (Co) fine particles, iron (Fe) fine particles, and nickel (Ni) fine particles as a catalytic material, the cobalt (Co) fine particles and the nickel (Ni) fine particles are generated using, for example, a laser ablation method, and the cobalt (Co) fine particles 13, the iron (Fe) fine particles 14, and the nickel (Ni) fine particles 21 having an average particle diameter (diameter) aligned by applying, for instance, a method using a DMA, a method using an impactor, or the like, are deposited in the mixed state in one layer on the titanium nitride (TiN) thin film 12. The deposition is conducted separately according to the kinds of the different fine particles. The deposition can be performed by using different targets or by exchanging the targets in the same device. In the present embodiment, the cobalt (Co) fine particles 13, the iron (Fe) fine particles 14, and the nickel (Ni) fine particles 21 each having an average diameter controlled to fall within a range of 1 to 30 nm, here, about 4 nm, and each having a standard deviation of a diameter distribution controlled to within 1.5, here, about 1.3, are sequentially deposited on the titanium nitride (TiN) thin film 12.

Subsequently, CNTs 22 are grown.

In order to grow the CNTs, the silicon substrate 11 is placed in a not-illustrated CVD chamber, a temperature is raised to 450° C., and a mixed gas of acetylene as a source gas and argon as a buffer gas is introduced into the CVD chamber.

The cobalt (Co) fine particles, the nickel (Ni) fine particles, and the iron (Fe) fine particles differ in optimal growth conditions due to a difference in their catalytic abilities. In the present embodiment, the CNTs 22 are grown at first using the cobalt (Co) fine particles 13 as nuclei, as shown in FIG. 2B. Further, this growth condition is also suitable for nickel (Ni), so that CNTs 23 can be grown using the nickel (Ni) fine particles 21 as nuclei.

Specifically, at first, by introducing the mixed gas of acetylene and argon in which a partial pressure of acetylene with respect to that of argon is 0.005% into the CVD chamber, and setting a pressure in the whole chamber at 1 kPa, the CNTs 22 are grown using the cobalt (Co) fine particles 13 as the nuclei. Further, the CNTs 23 are grown using the nickel (Ni) fine particles 21 as the nuclei. Under this growth condition, the CNTs are grown only from the cobalt (Co) fine particles and the nickel (Ni) fine particles, and rarely from the iron (Fe) fine particles.

Next, as shown in FIG. 2C, CNTs 24 are grown using the iron (Fe) fine particles 14 as nuclei.

Specifically, a growth temperature is raised to 600° C., the above-described mixed gas in which a partial pressure of acetylene with respect to that of argon is 10% is introduced into the CVD chamber, and the pressure in the whole chamber is set at 1 kPa, to thereby grow the CNTs 24 using the iron (Fe) fine particles 14 as the nuclei.

Here, there also exists a growth condition under which the CNTs 22, 23 and 24 are collectively grown from the cobalt (Co) fine particles 13, the iron (Fe) fine particles 14, and the nickel (Ni) fine particles 21.

Specifically, it is required such that the above-described mixed gas in which a partial pressure of argon with respect to that of acetylene is 10% is introduced into the CVD chamber, and the pressure in the whole chamber and the growth temperature are respectively set at 1 kPa and 600° C. Accordingly, the CNTs 22, 23 and 24 can be grown using the cobalt (Co) fine particles 13, the iron (Fe) fine particles 14, and the nickel (Ni) fine particles 21, respectively, as the nuclei, by a single CVD process.

Note that, when using the cobalt (Co) fine particles, the nickel (Ni) fine particles, and the iron (Fe) fine particles as a catalytic material, it is desirable that the base material be at least one kind selected from the group consisting of titanium (Ti), tantalum (Ta), tantalum nitride (TaN), titanium silicide (TiSi), hafnium nitride (HfN), molybdenum (Mo), and aluminum (Al), in addition to the titanium nitride (TiN) thin film. Further, when a tantalum (Ta) thin film is formed as a base material or formed under the base material (for instance, titanium nitride (TiN)), it is possible to form a metal wiring such as aluminum (Al), copper (Cu), platinum (Pt), and gold (Au) just under the tantalum (Ta) thin film, since the tantalum (Ta) thin film is excellent especially in preventing a diffusion of the metal.

Further, the three kinds of catalytic fine particles being the catalytic material are not limited to cobalt (Co), nickel (Ni), and iron (Fe), but may be formed of three kinds of mutually different metals selected from the metal group consisting of iron (Fe), nickel (Ni), cobalt (Co), gold (Au), silver (Ag), and copper (Cu), or three kinds of mutually different alloys selected from the alloy group consisting of alloys composed of two kinds or more of iron (Fe), nickel (Ni), cobalt (Co), gold (Au), silver (Ag), and copper (Cu). Further, an alloy of the above-described base material and the catalytic material such as titanium/cobalt (TiCo) and molybdenum/cobalt (MoCo) can also be applied.

If only one kind of the catalytic fine particle is used, when raising the temperature to the growth temperature of the CNT, the catalytic fine particles aggregate to each other, and the activity is lowered. On the other hand, when the catalytic fine particles made of the plurality of kinds of different elements, the three kinds of the cobalt (Co) fine particles 13, the iron (Fe) fine particles 14, and the nickel (Ni) fine particles 21 in the present embodiment, are mixed, such an aggregation is unlikely to happen. Even when compared to a case of using the two kinds of fine particles, a possibility that the catalytic fine particles made of the same element come in contact with each other is further lowered, which allows for suppressing the aggregation even more. Therefore, it becomes possible to grow the CNTs 22, 23 and 24 with diameters corresponding to the sizes of the generated cobalt (Co) fine particles 13, the iron (Fe) fine particles 14, and the nickel (Ni) fine particles 21 in high density. Further, since the cobalt (Co) fine particles 13, the iron (Fe) fine particles 14, and the nickel (Ni) fine particles 21 differ in catalytic abilities from each other, even when they are adjacent and in contact, they have little effect on mutual activities.

As described above, according to the present embodiment, it is possible to grow the CNTs 22, 23 and 24 made of carbon elements with controlled diameters in high density by forming the catalytic material, here, the cobalt (Co) fine particles 13, the iron (Fe) fine particles 14, and the nickel (Ni) fine particles 21, easily and certainly in a mixed state of uniform and high-density fine particles by a simple structure.

Third Embodiment

Figure 3A:
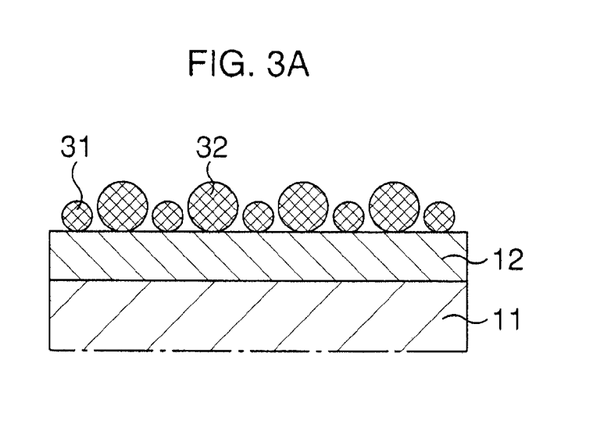
FIGS. 3A to 3C are schematic sectional views showing a manufacturing method of a substrate structure according to a third embodiment in order of step.
Figure 3B:
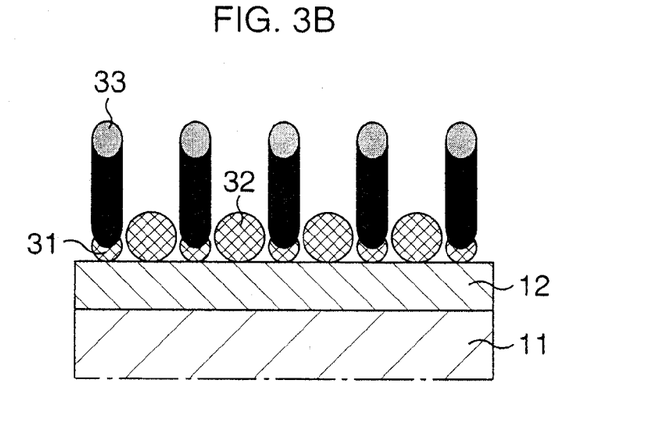
Figure 3C:
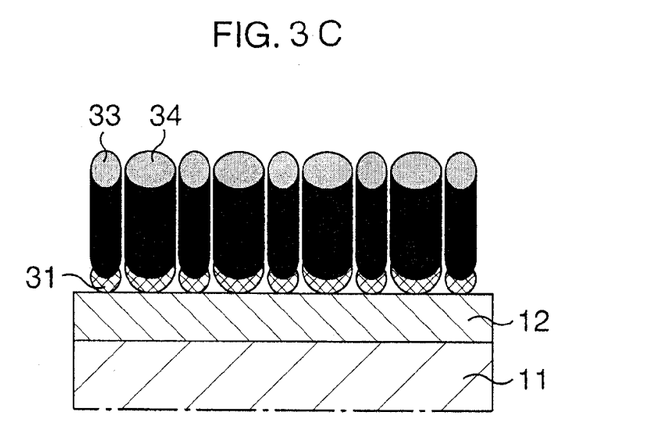

FIGS. 3A to 3C are schematic sectional views showing a manufacturing method of a substrate structure according to a third embodiment in order of step.

As shown in FIG. 3A, after forming the titanium nitride (TiN) thin film 12 on the silicon substrate 11, two kinds of iron (Fe) fine particles 31 and 32 different in sizes from each other are deposited in a mixed state on the titanium nitride (TiN) thin film 12.

Specifically, at first, with the use of titanium nitride (TiN) as a base material, the titanium nitride (TiN) thin film 12 is formed to have about 5 nm in film thickness on the silicon substrate 11 using, for instance, a sputtering method.

Next, with the use of iron (Fe) fine particles as a catalytic material, the iron (Fe) fine particles are generated using, for example, a laser ablation method, and the iron (Fe) fine particles 31 and 32 having two kinds of average particle diameters (diameters) aligned by applying, for instance, a method using a differential mobility analyzer (DMA) described in Patent Document 1, a method using an impactor described in Patent Document 2, or the like, are deposited in the mixed state in one layer on the titanium nitride (TiN) thin film 12. The deposition is successively conducted according to the diameters of the different fine particles. In the present embodiment, the iron (Fe) fine particles 31 having an average diameter controlled to fall within a range of 1 to 30 nm, here, about 4 nm, and a standard deviation of a diameter distribution controlled to be within 1.5, here, about 1.3, and the iron (Fe) fine particles 32 having an average diameter controlled to fall within a range of 1 to 30 nm, here, about 2 nm, and a standard deviation of a diameter distribution controlled to be within 1.5, here, about 1.3, are sequentially deposited on the titanium nitride (TiN) thin film 12.

Subsequently, CNTs 33 and 34 are grown.

In order to grow the CNTs, the silicon substrate 11 is placed in a not-illustrated CVD chamber, a temperature is raised to 590° C., and a mixed gas of acetylene as a source gas and argon as a buffer gas is introduced into the CVD chamber.

The iron (Fe) fine particles 31 and 32 differ in optimal growth conditions due to a difference in their catalytic abilities. In the present embodiment, the CNTs 33 are grown at first using the iron (Fe) fine particles 31 as nuclei, as shown in FIG. 3B.

Specifically, by introducing the mixed gas of acetylene and argon in which a partial pressure of acetylene with respect to that of argon is 10% into the CVD chamber, in which the mixed gas of acetylene and argon is diluted to 0.2% by further adding hydrogen, and setting a pressure in the whole chamber at 0.1 kPa, the CNTs 33 are grown using the iron (Fe) fine particles 31 as the nuclei. Under this growth condition, mainly, the CNTs are grown only from the iron (Fe) fine particles 31, and rarely from the iron (Fe) fine particles 32.

Next, as shown in FIG. 3C, CNTs 34 are grown using the iron (Fe) fine particles 32 as nuclei.

Specifically, by introducing the above-described mixed gas in which a partial pressure of acetylene with respect to that of argon is 10% into the CVD chamber, in which the mixed gas of acetylene and argon is diluted to 20% by further adding hydrogen, and setting a pressure in the whole chamber at 1 kPa, the CNTs 34 are grown using the iron (Fe) fine particles 32 as the nuclei. Under this growth condition, the CNTs are grown only from the iron (Fe) fine particles 32, and rarely from the iron (Fe) fine particles 31.

Note that, when using the iron (Fe) fine particles as a catalytic material, it is desirable that the base material be at least one kind selected from the group consisting of titanium (Ti), tantalum (Ta), tantalum nitride (TaN), titanium silicide (TiSi), hafnium nitride (HfN), molybdenum (Mo), and aluminum (Al), in addition to the titanium nitride (TiN) thin film. Further, when a tantalum (Ta) thin film is formed as a base material or formed under the base material (for instance, titanium nitride (TiN)), it is possible to form a metal wiring such as aluminum (Al), copper (Cu), platinum (Pt), and gold (Au) just under the tantalum (Ta) thin film, since the tantalum (Ta) thin film is excellent especially in preventing a diffusion of the metal.

Further, when the catalytic material is formed using two kinds of catalytic fine particles made of the same material and differed in diameters, the catalytic material is not limited to cobalt (Co), but may be formed of one kind of metal selected from the metal group consisting of iron (Fe), nickel (Ni), cobalt (Co), gold (Au), silver (Ag), and copper (Cu), or one kind of alloy selected from the alloy group consisting of alloys composed of two kinds or more of iron (Fe), nickel (Ni), cobalt (Co), gold (Au) silver (Ag), and copper (Cu). Further, an alloy of the above-described base material and the catalytic material such as titanium/cobalt (TiCo) and molybdenum/cobalt (MoCo) can also be applied.

Also in the present embodiment, since the iron (Fe) fine particles 31 and 32 differ in catalytic abilities from each other, the aggregation can be prevented, and even when they are adjacent and in contact, they have little effect on mutual activities. Further, the diameter of the CNT is defined by the size of the catalytic fine particle, so that as a growth state, the CNTs 33 and 34 having different diameters can be grown, which enables to form a CNT bundle with higher density.

As described above, according to the present embodiment, it is possible to grow the CNTs 33 and 34 made of carbon elements with controlled diameters in high density by forming the catalytic material, here, the iron (Fe) fine particles 31 and 32 differed in diameters, easily and certainly in a mixed state of uniform and high-density fine particles by a simple structure.

Fourth Embodiment

In the present embodiment, a case where a method of forming catalytic fine particles made of two kinds of different elements explained in the first embodiment is applied to a via portion of a wiring structure is described as an example.

FIGS. 4A to 4E are schematic sectional views showing a manufacturing method of the via portion of the wiring structure according to the fourth embodiment in order of step.

Figures 4A, 4B, 4C, 4D, 4E:
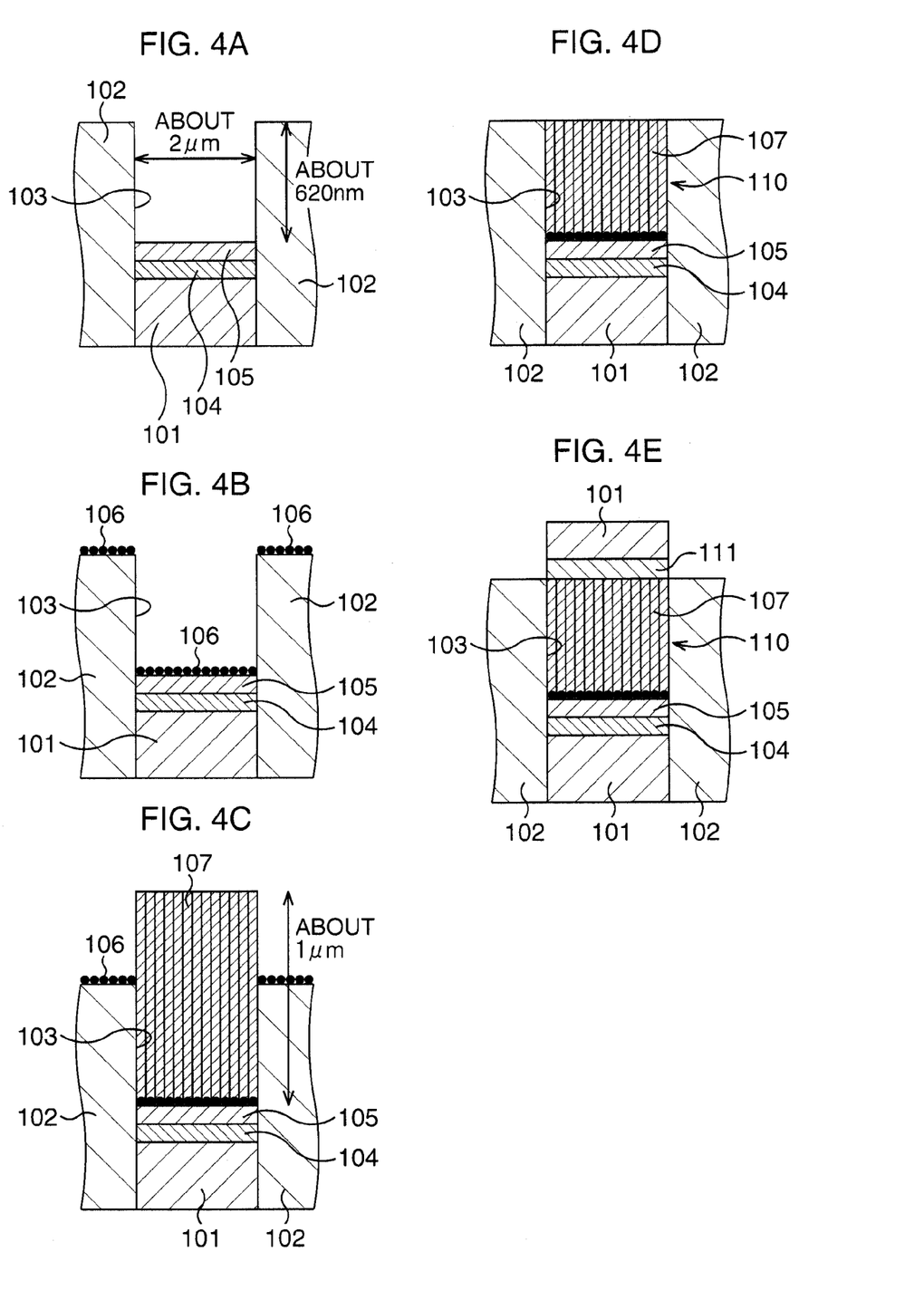
FIGS. 4A to 4E are schematic sectional views showing a manufacturing method of a substrate structure according to a fourth embodiment in order of step.

First, as shown in FIG. 4A, on an interlayer insulating film 102 formed above a silicon substrate (not shown), for example, a copper (Cu) wiring 101 with about 300 nm in film thickness is formed using, for instance, a damascene method, and thereafter, a via hole 103 is formed to have, for instance, about 2 μm in diameter and about 620 nm in depth in the interlayer insulating film 102 so as to expose a part of a surface of the copper (Cu) wiring 101. The interlayer insulating film 102 is formed of, for instance, a silicon oxide film, a TEOS film, or a desired low dielectric constant material film.

Next, on the copper (Cu) wiring 101 exposed at a bottom portion of the via hole 103, a tantalum (Ta) thin film 104 and a titanium nitride (TiN) thin film 105 are sequentially deposited to have about 15 nm and about 5 nm in film thickness, respectively, with the use of, for instance, a sputtering method. Here, the titanium nitride (TiN) thin film 105 is a base material for supporting a formation of CNTs, and the tantalum (Ta) thin film 104 is a diffusion preventing layer for preventing a diffusion of copper (Cu) of the copper (Cu) wiring 101. Ultimately, after growing the CNTs, a polishing is conducted using CMP, so that tantalum (Ta) and titanium nitride (TiN) may be deposited on the whole surface of the substrate.

Subsequently, catalytic fine particles 106 are deposited, as shown in FIG. 4B.

Specifically, cobalt (Co) fine particles and nickel (Ni) fine particles as the catalytic fine particles 106 are deposited in a mixed state on the whole surface including inside of the via hole 103. Here, the cobalt (Co) fine particles and the nickel (Ni) fine particles are collectively illustrated as the catalytic fine particles 106, for the sake of illustration.

In this case, the cobalt (Co) fine particles and the nickel (Ni) fine particles are generated by, for example, a laser ablation method, and the cobalt (Co) fine particles and the nickel (Ni) fine particles having an average particle diameter (diameter) aligned by using an impactor, for instance, are deposited in the mixed state in one layer on the titanium nitride (TiN) thin film 105. When the impactor is used, the fine particles rarely adhere to side walls of the via since the fine particles exhibit high directivity when being deposited at the bottom of the via. In the present embodiment, the cobalt (Co) fine particles and the nickel (Ni) fine particles each having an average diameter controlled to fall within a range of 1 to 30 nm, here, about 4 nm, and each having a standard deviation of a diameter distribution controlled to be within 1.5, here, about 1.3, are deposited on the titanium nitride (TiN) thin film 105.

Next, as shown in FIG. 4C, CNTs 107 are grown.

Specifically, a CVD method is conducted by introducing a mixed gas of acetylene and argon in which a partial pressure of acetylene with respect to that of argon is 0.0025% into the CVD chamber, and setting a growth temperature and a pressure in the whole chamber at 450° C. and 1 kPa, respectively. As described above, by performing the CVD method under one kind of CVD condition, the CNTs 107 are grown to have about 1 μm in height using the catalytic fine particles 106 deposited on the titanium nitride (TiN) thin film 105 as nuclei. By applying such a CVD condition, it is possible to perform a selective growth in which no CNTs are grown from on the interlayer insulating film 102 except on the titanium nitride (TiN) thin film 105.

Note that, when it is required to remove a residue of the catalytic fine particles 106 existing on the interlayer insulating film 102, a lift-off method and the like can be employed to remove the catalytic fine particles 106.

Subsequently, as shown in FIG. 4D, portions of the CNTs 107 protruding from an opening portion of the via hole 103 are polished to be flatten by a chemical mechanical polishing (CMP) method using a surface of the interlayer insulating film 102 as a polishing stopper, to thereby form a via portion 110 filling the inside of the via hole 103 with the CNTs 107.

Next, as shown in FIG. 4E, a copper (Cu) wiring 101 is formed on the via portion 110 by the damascene method using a titanium (Ti) thin film 111 as a barrier metal. For the barrier metal, it is only required to have effects of suppressing a diffusion of a wiring material caused by heat, and of reducing a contact resistance with a CNT wiring, so that for the material of the barrier metal, the one including at least one kind selected from the group consisting of titanium nitride (TiN), tantalum (Ta), tantalum nitride (TaN), titanium silicide (TiSi), hafnium nitride (HfN), and molybdenum (Mo), in addition to titanium (Ti), is preferable.

Figure 5:
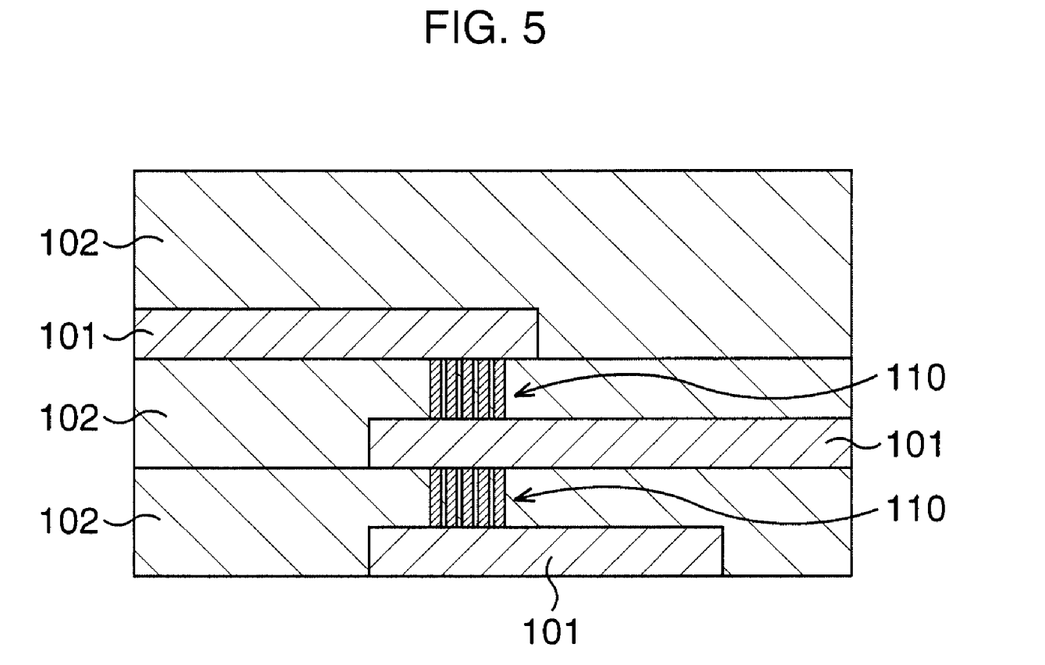
FIG. 5 is a schematic sectional view showing a configuration of a wiring structure completed according to the fourth embodiment.

By repeatedly conducting the processes shown in FIGS. 4A to 4E, a wiring structure shown in FIG. 5, for instance, is formed.

Note that, in the present embodiment, a case where the manufacturing method of the substrate structure of the present invention is applied to the via portion of the wiring structure is described as an example, but, in addition to that, it can be utilized in a wide range of technical fields such as various sensors like an acceleration sensor, an electronic device, a heat dissipation device, and the like.

According to the present invention, a substrate structure capable of growing a linear structure made of a carbon element with a controlled diameter in high density by forming a catalytic material easily and certainly in a state of uniform and high-density fine particles by a simple structure is realized.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A substrate structure, comprising:
   a substrate;
   a base material formed in a region above said substrate;
   a catalytic material formed in the region; and
   a linear structure made of a carbon element and formed on said catalytic material,
   wherein said catalytic material contains at least first catalytic fine particles made of a first catalytic material and second catalytic fine particles made of a second catalytic material different from said first catalytic material; and
   wherein said linear structure is formed from each of the first and second catalytic fine particles.

2. The substrate structure according to claim 1,
   wherein the respective catalytic fine particles contain at least one kind of metal selected from the metal group consisting of iron (Fe), nickel (Ni), cobalt (Co), gold (Au), silver (Ag), and copper (Cu), or at least one kind of alloy selected from the alloy group consisting of alloys composed of two kinds or more of iron (Fe), nickel (Ni), cobalt (Co), gold (Au), silver (Ag), and copper (Cu).

3. The substrate structure according to claim 1,
   wherein the respective catalytic fine particles are formed of the same material.

4. The substrate structure according to claim 1,
   wherein the respective catalytic fine particles differ in sizes from each other.

5. The substrate structure according to claim 1,
   wherein the respective catalytic fine particles have an average value of diameters controlled to fall within a range of 1 to 30 nm, and a standard deviation of a diameter distribution controlled to be within 1.5.

6. The substrate structure according to claim 1,
   wherein said base material contains at least one kind selected from the group consisting of titanium (Ti), tantalum (Ta), titanium nitride (TiN), tantalum nitride (TaN), aluminum (Al), hafnium nitride (HfN), molybdenum (Mo), and titanium silicide (TiSi).

7. A manufacturing method of a substrate structure, comprising:
   forming a base material in a region above a substrate;
   forming a catalytic material in the region; and
   growing a linear structure made of a carbon element using the catalytic material as a nucleus,
   wherein the catalytic material is formed by mixing a plurality of kinds of catalytic fine particles each having a different catalytic ability.

8. The manufacturing method of the substrate structure according to claim 7,
   wherein the respective catalytic fine particles contain at least one kind of metal selected from the metal group consisting of iron (Fe), nickel (Ni), cobalt (Co), gold (Au), silver (Ag), and copper (Cu), or at least one kind of alloy selected from the alloy group consisting of alloys composed of two kinds or more of iron (Fe), nickel (Ni), cobalt (Co), gold (Au), silver (Ag), and copper (Cu).

9. The manufacturing method of the substrate structure according to claim 7,
   wherein the respective catalytic fine particles are formed of each different material.

10. The manufacturing method of the substrate structure according to claim 9,
    wherein the linear structures are grown under each different growth condition using the respective catalytic fine particles as the nuclei due to a difference in catalytic abilities of the respective catalytic fine particles, at the time of said growth of the linear structure.

11. The manufacturing method of the substrate structure according to claim 7,
    wherein the respective catalytic fine particles are formed of the same material.

12. The manufacturing method of the substrate structure according to claim 7,
    wherein the respective catalytic fine particles differ in sizes from each other.

13. The manufacturing method of the substrate structure according to claim 7,
    wherein the respective catalytic fine particles have an average value of diameters controlled to fall within a range of 1 to 30 nm, and a standard deviation of a diameter distribution controlled to be within 1.5.

14. The manufacturing method of the substrate structure according to claim 7,
    wherein the base material contains at least one kind selected from the group consisting of titanium (Ti), tantalum (Ta), titanium nitride (TiN), tantalum nitride (TaN), aluminum (Al), hafnium nitride (HfN), molybdenum (Mo), and titanium silicide (TiSi).

* * * * *